(12) United States Patent
Kiura (10) Patent No.: US 8,977,100 B2
(45) Date of Patent: Mar. 10, 2015

(54) VIDEO SERVER AND CONTROLLING METHOD FOR VIDEO SERVER

(75) Inventor: Kenichi Kiura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 72 days.

(21) Appl. No.: 13/598,083

(22) Filed: Aug. 29, 2012

(65) Prior Publication Data

US 2013/0071096 A1    Mar. 21, 2013

(30) Foreign Application Priority Data

Sep. 16, 2011    (JP) ................. P2011-202512

(51) Int. Cl.
*H04N 5/932*    (2006.01)
*H04N 5/93*    (2006.01)

(52) U.S. Cl.
CPC ........................ *H04N 5/93* (2013.01)
USPC ............................. 386/219; 386/248

(58) Field of Classification Search
None
See application file for complete search history.

(56) References Cited

U.S. PATENT DOCUMENTS

| 2004/0160527 A1* | 8/2004 | Correa et al. ............... 348/447 |
| 2008/0037151 A1* | 2/2008 | Fujimoto et al. ............ 360/18 |
| 2008/0247455 A1* | 10/2008 | Lin ........................ 375/240.01 |
| 2011/0181697 A1* | 7/2011 | Oshima et al. .............. 348/43 |

* cited by examiner

*Primary Examiner* — William C Vaughn, Jr.
*Assistant Examiner* — Eileen Adams
(74) *Attorney, Agent, or Firm* — Baker Botts L.L.P.

(57) ABSTRACT

According to one embodiment, a video server reads a first type of video signal for one screen from a memory address related to a screen based on a clock pulse if first information in order to read the first type of video signal from the memory device with the first predetermined time interval and the clock pulse are received, and reads a second type of video signal for integral multiple screens from the playback controller in order to read the second type of video signal from the memory device with a changing point of the clock pulse level if the second information from the playback controller in order to read the second type of video signal from the memory device with the first predetermined time interval and the clock pulse are received.

11 Claims, 7 Drawing Sheets

FIG. 1

| Timing Information | Screen | Memory Address |
|---|---|---|
| 33ms | 1-1 | 0··010 |
| 66ms | 1-2 | 0··011 |
| ⋮ | ⋮ | ⋮ |
| XXms | 1-n | O··O△△ |

| Timing Information | Screen | Memory Address |
|---|---|---|
| 33ms | 3-1 I-Frame | 0··010 |
| | 3-2 B-Frame | 0··011 |
| 66ms | 3-3 B-Frame | 0··100 |
| | 3-4 P-Frame | 0··101 |
| ⋮ | ⋮ | ⋮ |
| XXms | 3-p | 0··0△△ |
| | 4-1 I-Frame | 0··0△× |

VIDEO SERVER AND CONTROLLING METHOD FOR VIDEO SERVER

CROSS-REFERENCE TO RELATED APPLICATIONS

This application is based upon and claims the benefit of priority from prior Japanese Patent Application No. 2011-202512, filed Sep. 16, 2011, the entire contents of which are incorporated herein by reference.

FIELD

Embodiments described herein relate generally to a video server and controlling method for video sever.

BACKGROUND

In recent years, a broadcasting system has come to deal with various video signals. As to these different video signals, there are interlaced video signals which change a display screen in a cycle of 33 ms (milli-second), and progressive video signals which change a display screen in a cycle of 16.5 ms.

Moreover, in a broadcasting system, video signals, such as a video signal sent through a line or taken by a surveillance camera, are temporarily stored in a video server. The video signal stored in the video server is sent out from the video server.

When playing back the video recorded in the interlaced video signal, the screen of one sheet is outputted in a cycle of 33 ms. When playing back the video recorded in progressive video signal, the screen of one sheet is outputted in a cycle of 16.5 ms which are the time of the half in the case of playing back interlaced video signal. When carrying out playback control of the progressive video signal, it is necessary to perform control at intervals of the cycles of 16.5 ms. However, controlling at intervals of a half compared with the playback of interlaced video signal doubles processing load. As a result, other processing may affect the playback of a progressive video signal. Moreover, software becomes complicated when the video server deals with both the playback of interlaced video signal, and the playback of progressive video signal, i.e., when the video server deals with the plurality of modes in which the intervals of control differ.

DETAILED DESCRIPTION

In general and according to one embodiment, a video server reads a first type of video signal for one screen from a memory address related to a screen based on a clock pulse if first information in order to read the first type of video signal from the memory device with the first predetermined time interval and the clock pulse are received, and reads a second type of video signal for integral multiple screens from the playback controller in order to read the second type of video signal from the memory device with a changing point of the clock pulse level if the second information from the playback controller in order to read the second type of video signal from the memory device with the first predetermined time interval and the clock pulse are received.

[First Embodiment]

Figure 1:
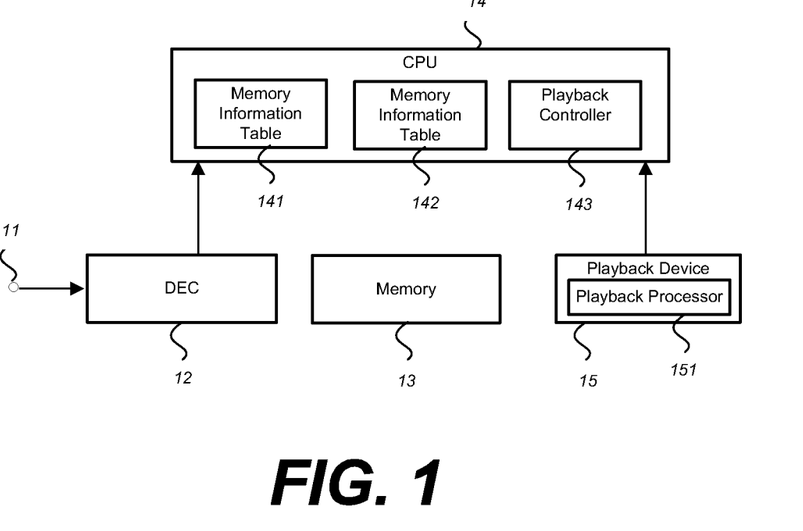
FIG. 1 is a block diagram showing the configuration of the video server according to the first embodiment.

FIG. 1 is a block diagram showing the configuration of the video server according to the first embodiment.

In FIG. 1, the encoded interlaced video signal inputted into the input terminal 11 is outputted to the decoder 12. By decoding an encoded interlaced video signal, the decoder 12 generates an interlaced video signal, and transmits interlaced video signal to the suitable address of the memory 13. After the end of transmission, the decoder 12 notifies the address of the memory 13 on which interlaced video signal was recorded to a CPU 14.

Figure 2:
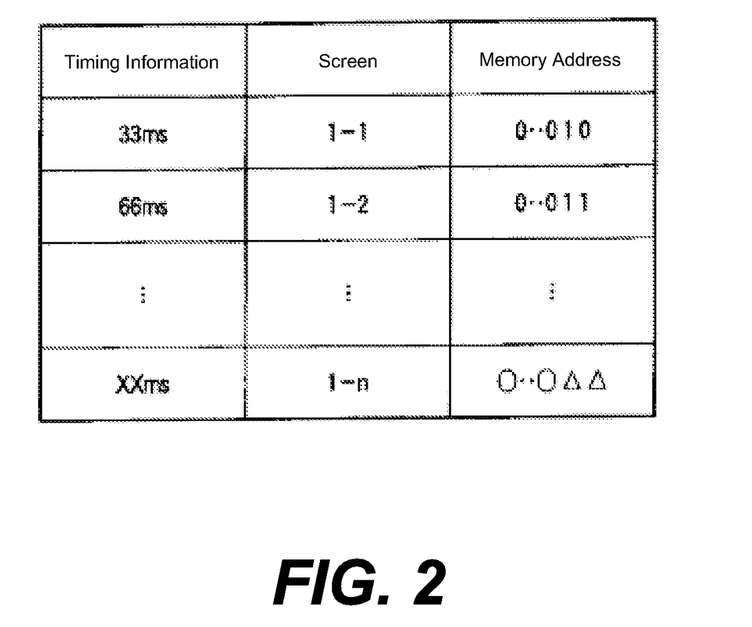
FIG. 2 is a figure showing an example of the memory content of the memory information table for interlaced video signal.

The CPU 14 generates the memory information in table 141 based on the notice from the decoder 12. As shown in FIG. 2, the memory information table 141 stores the timing information which shows the timing to which the memory information table 141 reads one screen for interlaced video signal from the memory 13, the screen information which identifies a screen, and the memory address which shows the storing place, which are related each other.

Moreover, the CPU 14 outputs the control signal for playing back a video signal to the playback device 15 according to the playback command from a host system. A control signal includes a flag that indicates to play back interlaced video signal or progressive video signal, the screen information, and the memory address of the screen. The playback device 15 reads interlaced video signal from the memory address to which the memory 13 corresponds based on the control signal from the CPUs14, and outputs the interlaced video signal to the output terminal 16.

By the way, the CPU 14 has the memory information table 142 and the playback controller 143 in the first embodiment.

The encoded progressive video signal inputted from the input terminal 11 is outputted to the decoder 12. The decoder 12 decodes a coding progressive video signal, and transmits the progressive video signal to the suitable address of the memory 13. After completing the transmission, the decoder 12 notifies the address on the memory 13 in which interlaced video signal is stored to the CPU 14.

Figures 3, 4:
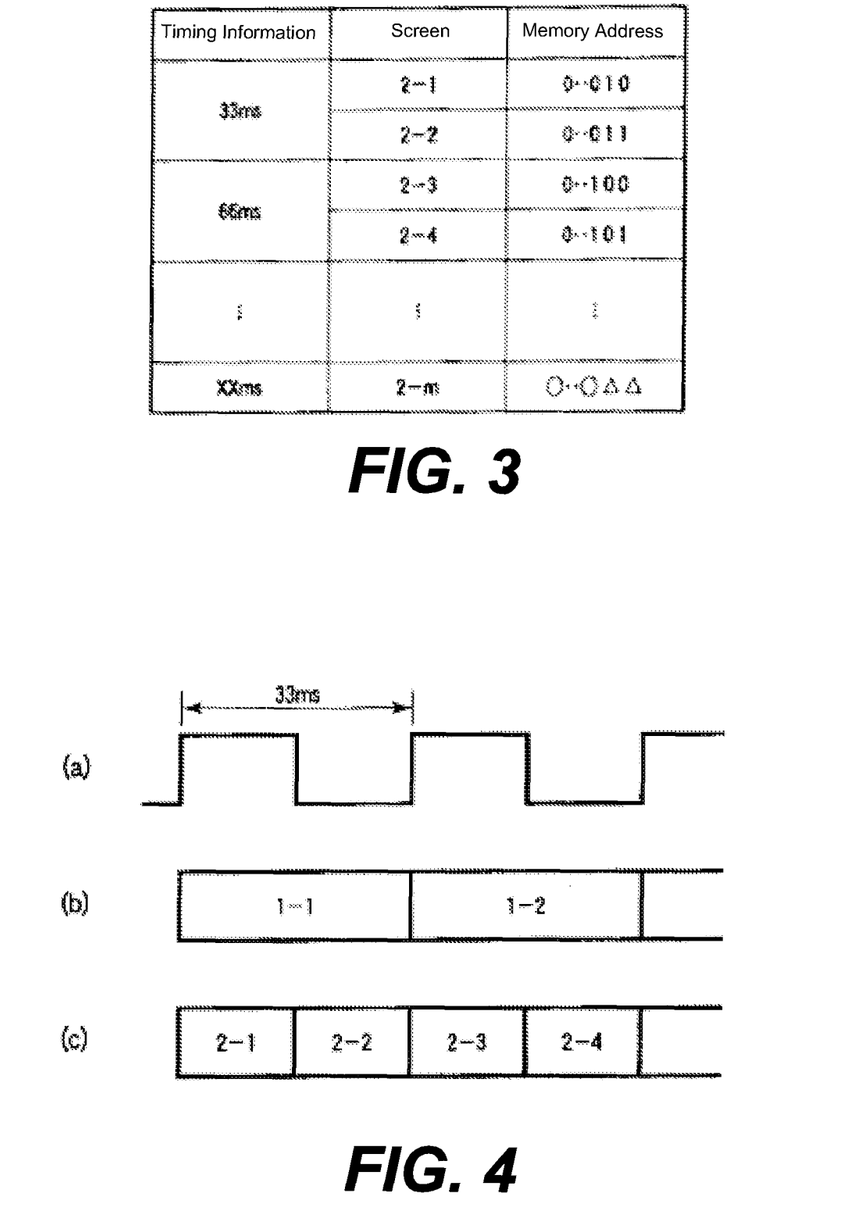
FIG. 3 is a figure showing an example of the memory content of the memory information table for progressive video signal.
FIG. 4 is a timing diagram showing read-out operation of interlaced video signal by a clock pulse, and progressive video signal.

The CPU14 generates the memory information table 142 based on the notice from the decoder 12. As shown in FIG. 3, the memory information table 142 stores the timing information which reads the progressive video signal of two screens, the screen information which identifies a screen, and the memory address on the memory 13 in which interlaced video signal is stored, which are related each other.

When the playback controller 143 receives the playback command of an interlaced video signal from a host system, with reference to the memory information table 141, the playback controller 143 outputs the screen information related to one screen for reading from the memory 13 and the memory address of the one screen to the playback device 15 with the flag which identifies interlaced video signal based on this reference result. Moreover, the playback controller 143 outputs the clock pulse in a cycle of 33 ms to the playback device 15.

When the playback command for playback of progressive video signal is received from a host system, with reference to the memory information table 141, the playback controller 143 outputs the screen information related to two screens for reading from the memory 13 and the memory address of the one screen to the playback device 15 with the flag which identifies interlaced video signal based on this reference result. Moreover, the playback controller 143 outputs the clock pulse in a cycle of 33 ms to the playback device 15.

The playback device 15 has a playback processor 151. When the playback processor 151 receives the flag which identifies interlaced video signal, The playback processor 151 reads the one screen of the interlaced video signal shown in FIG. 4(*b*) in a cycle of 33 ms from the address at 0-010 of the memory 13 based on the screen information of the one screen, the memory address, and the clock pulse in a cycle of 33 ms. When the playback processor 151 receives the flag and the screen information on two screens that progressive video signal is identified, and the clock pulse in a cycle of 33 ms, frame (2-1) shown in FIG. 4(*c*) is read from the address of 0-010 of the memory 13 at the changing point from low level for less than 33 ms of a clock pulse to high level, and frame (2-2) is read from the address of 0-011 at the changing point from high level to low level. Namely, when playing back progressive video signal, frame is read for every half cycle of the clock pulse in a cycle of 33 ms.

Next, the operation in the configuration is explained.

[In Case of Playback the Interlaced Video Signal]

Figure 5:
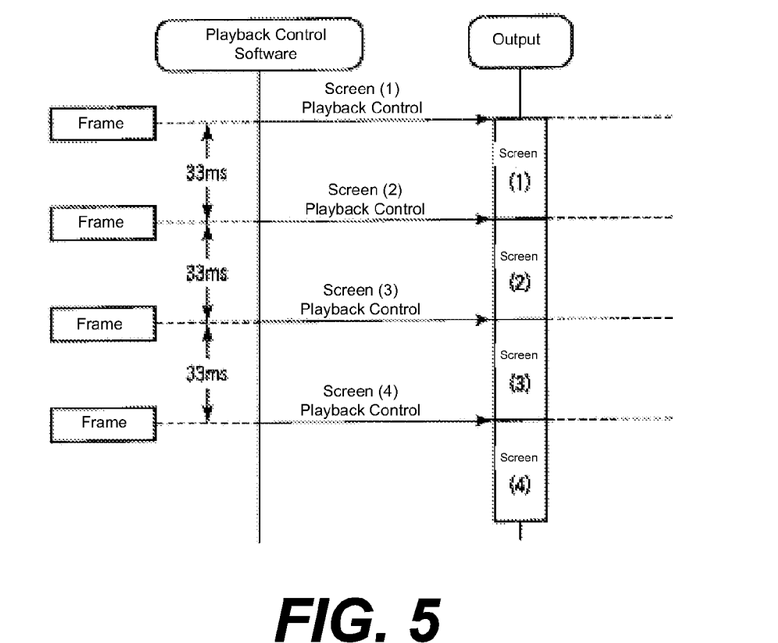
FIG. 5 is a timing diagram showing read-out operation of an interlaced video signal as a comparative example.

Since the one screen is outputted in a cycle of 33 ms when playing back interlaced video signal as shown in FIG. 5, the CPU 14 which controls a playback should just control the playback device 15 in a cycle of 33 ms.

[In Case of Playback the Progressive Video Signal]

Figure 6:
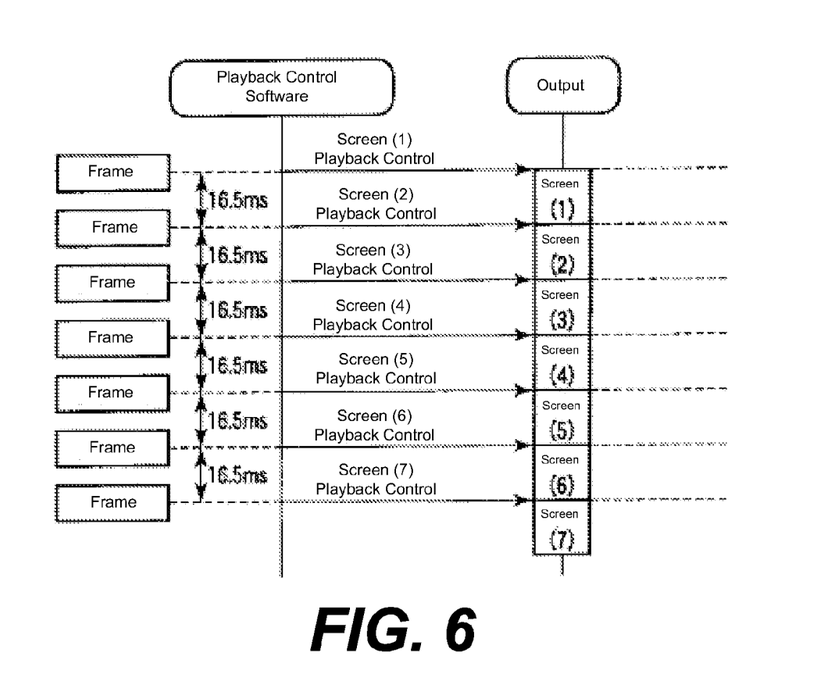
FIG. 6 is a timing diagram showing read-out operation of a progressive video signal as a comparative example.

Since progressive video signal outputs the one screen in a cycle of 16.5 ms of the half in the case of playing back interlaced video signal as shown in FIG. 6, the CPU 14 which controls a playback needs to control in a cycle of 16.5 ms. A throughput doubles compared with the case where interlaced video signal is played back. As a result, the processing load of software becomes high. Moreover, in the system which manages the playback of a plurality of video simultaneously by one software, When the system deals with both the playback of interlaced video signal, and the playback of progressive video signal, it is very difficult to manage each output timing, and the processing which the system performs is complicated processing.

[Operation of the First Embodiment]

Figure 7:
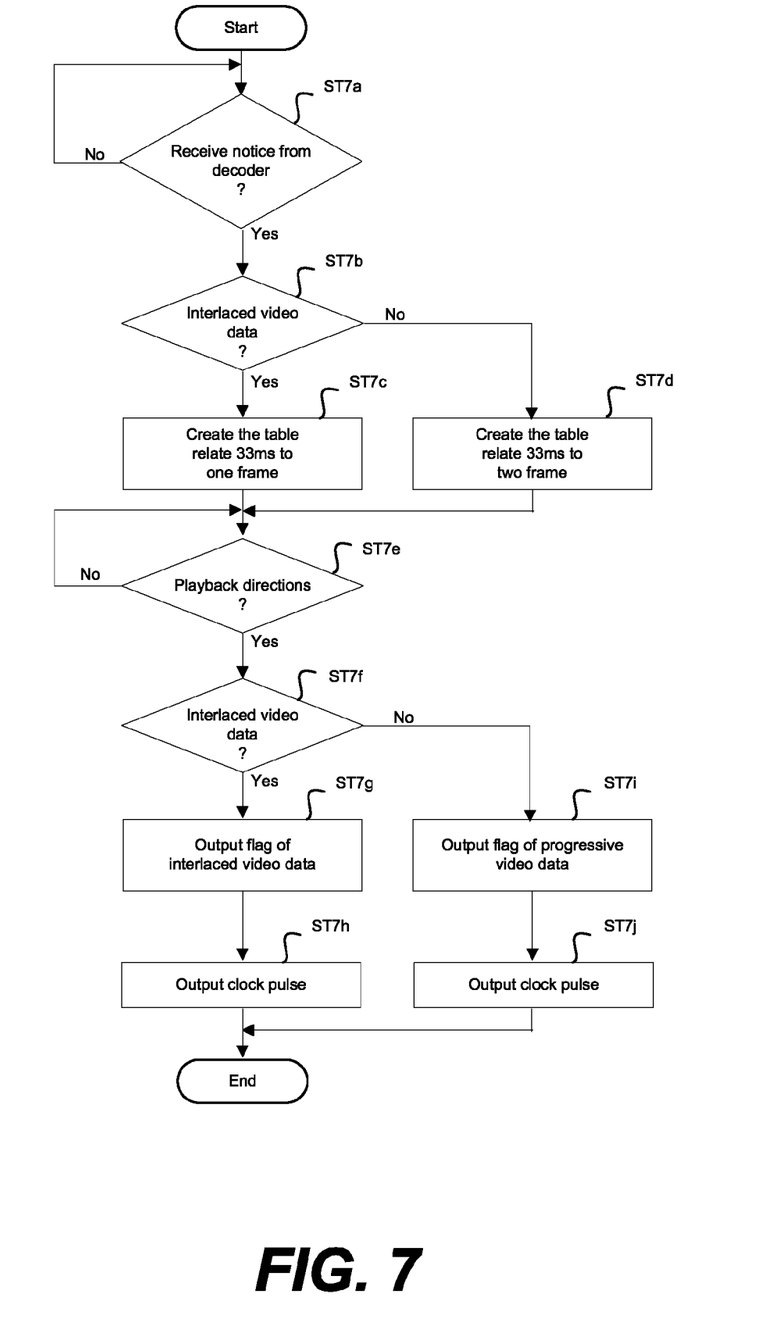
FIG. 7 is a flow chart which shows the control processing procedure of CPU.

FIG. 7 is a flow chart which shows the control processing procedure of the CPU 14.

First, it is monitored whether CPU14 has the notice from the decoder 12 (step ST7*a*). When a notice is received (Yes), the CPU 14 analyzes the contents of the notice and determines if it is the notice related to interlaced video signal (step ST7*b*). If it is the notice related to interlaced video signal (Yes), the CPU 14 generates the memory information table 141 including the control cycle of 33 ms for CPU14 to read interlaced video signal stored in the memory 13, the screen information of one screen, and memory address in which the frame was stored, which are related each other (step ST7*c*). If it is the notice related to progressive video signal (No), the CPU 14 generates the memory information table 141 including the control cycle of 33 ms for CPU14 to read progressive video signal stored in the memory 13, the screen information of two screens, and memory address in which the frame was stored, which are related each other (step ST7*d*).

And it is monitored whether CPU14 received the playback command from the host system (step ST7*e*). When a playback command is received (Yes), the CPU 14 determines if the video to play back is interlaced video signal (step ST7*f*). When the video to play back is interlaced video signal (Yes), the CPU14 outputs the flag for identifying interlaced video signal, and the screen information of the one screen to the playback device 15 (step ST7*g*). The CPU 14 outputs the clock pulse in a cycle of 33 ms to the playback device 15 (step ST7*h*).

When the video to play back is progressive video signal (No), the CPU 14 outputs the flag for identifying progressive video signal, the screen information of two screens, and the memory address of those frames to the playback device 15 (step ST7*i*). The CPU 14 outputs the clock pulse in a cycle of 33 ms to the playback device 15 (step ST7*j*).

Figure 8:
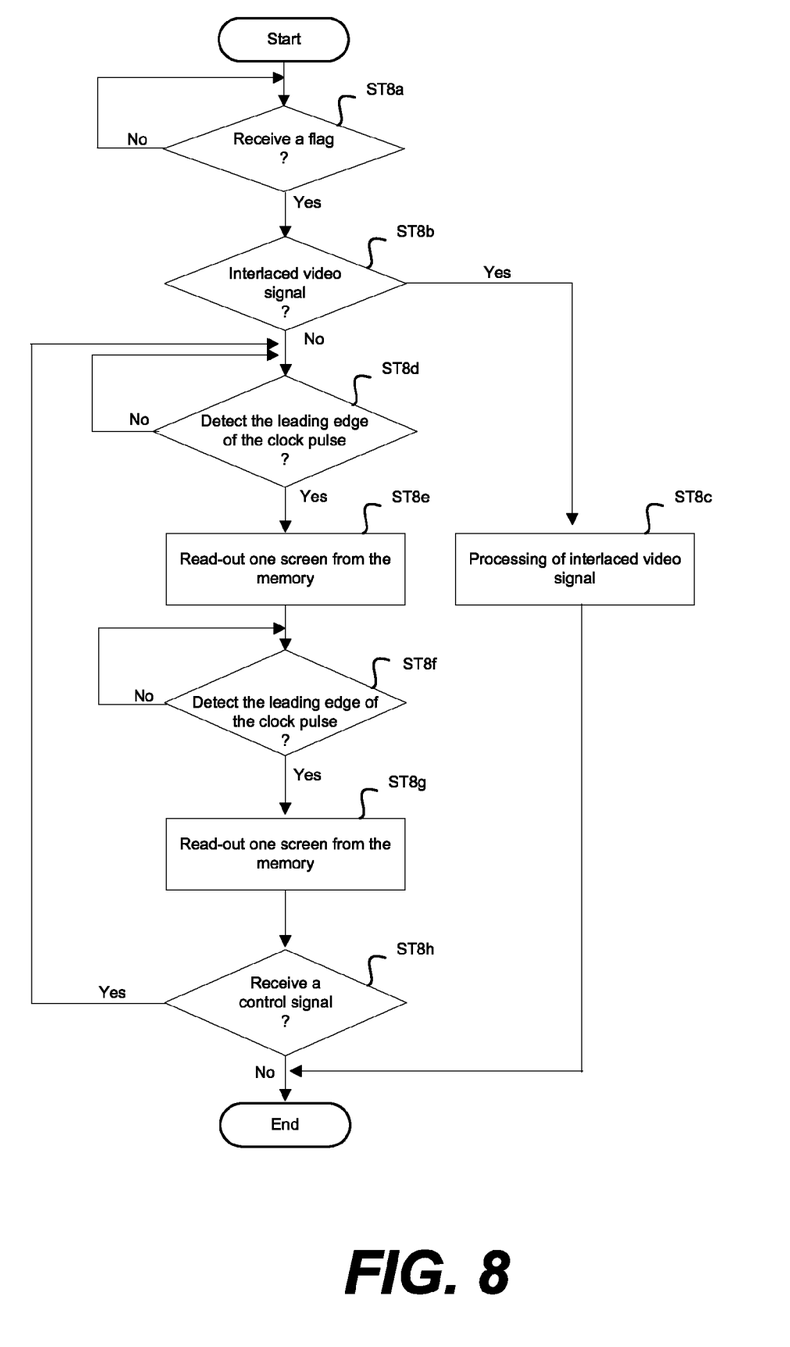
FIG. 8 is a flow chart which shows the control processing procedure of a playback device.

FIG. 8 is a flow chart which shows the control processing procedure of the playback device 15.

The playback device 15 monitors whether the flag to indicate progressive video signal or interlaced video signal was received from the CPU 14. When a flag is received (Yes), the playback device 15 determines if the video played back based on the contents of the flag is interlaced video signal (step ST8*b*). When the video to play back is interlaced video signal (Yes), The playback devices 15 performs for playback-output the interlaced video signal related to screen which is noticed from the playback controller 143, by reading the interlaced video signal of each one screen from the memory address, in accordance with the clock pulse and the screen information of the one screen (step ST8*c*).

If the video to play back is progressive video signal (No), the playback device 15 is monitored whether the leading edge of pulse is detected based on the screen information on the CPU 14 to two screens (step ST8*d*). When the leading edge of pulse is detected (Yes), the playback device 15 read the progressive video signal related to frame (2-1) of one screen from the memory 13, for example, the address at 0-010, (step ST8*e*). Then, the playback device 15 detects the trailing edge of a clock pulse (step ST8*f*).

If the trailing edge of a clock pulse is detected, the playback device 15 reads the progressive video signal related to frame (2-2) of one screen for example, from address at 0-0101 of the memory 13 (step ST8*g*).

And the playback device 15 repeats and performs processing the step ST8*d* or step ST8*h*, while a clock pulse is sent from the CPU 14. The playback device 15 ends processing, when a clock pulse stops (No).

As mentioned above in the first embodiment, when interlaced video signal and progressive video signal are stored in the memory 13, a video server is configured as follows. The CPU 14 is configured to store the memory information table 141 including the information to indicate the control cycle of 33 ms, one screen of the interlaced video signal which is controlled in a cycle of 33 ms, and address which indicates the storing place on the memory 13 of the one screen; and the information to indicate the control cycle of 33 ms, two screens of the progressive video signal which is controlled in a cycle of 33 ms, and address which indicates the storing place on the memory 13 of the two screens. When the playback command of interlaced video signal is received from a host system, the CPU 15 outputs the clock pulse for reading the one screen of interlaced video signal from the addresses of the memory 13 in a cycle of 33 ms to the playback device 15 with refer to the memory information table 141, Output the clock pulse for reading the screen of one sheet of interlaced video signal from the addresses of the memory 13 in a cycle of 33 ms to the playback device 15, and the playback device 15. The playback device 15, When the playback command of progressive video signal is received from a host system, While outputting an output, the playback device 15 is configured to output the flag and the screen information for identifying progressive video signal with reference to the memory information table 142, the playback device 15 is configured to output the clock pulse in a cycle of 33 ms including the information on the memory address in which progressive video signal to the playback device 15, and perform to control for playback the two screens of progressive video signal from the addresses of the memory 13 among 33 ms simultaneously.

When the flag and control clock pulse of an interlaced video signal are received, the playback device 15 is configured to read the screen of one screen of interlaced video signal from the addresses of the memory 13 in a cycle of 33 ms. When the flag and clock pulse which show progressive video signal are received, the playback device 15 is configured to read frame of one screen of progressive video signal (2-1) from the addresses of the memory 13 on the leading edge of pulse in the cycles of 33 ms of a clock pulse, and to read frame of one sheet of progressive video signal (2-2) from the addresses of the memory 13 on the trailing edge of a clock pulse.

Therefore, not the CPU 14 but the playback device 15 performs playback control which deals with both interlaced video signal and progressive video signal. Thereby, the CPU 14 should just perform playback control of progressive video signal in a cycle of [same] 33 ms as interlaced video signal. As a result, the load of CPU14 is reduced. Moreover, since the playback control which the CPU 14 performs is unified into the cycles of 33 ms, it can more easily achieve playback control which deals with both interlaced video signal and progressive video signal.

[Second Embodiment]

In the second embodiment, the case where progressive video signal has GOP structure is explained.

Figure 9:
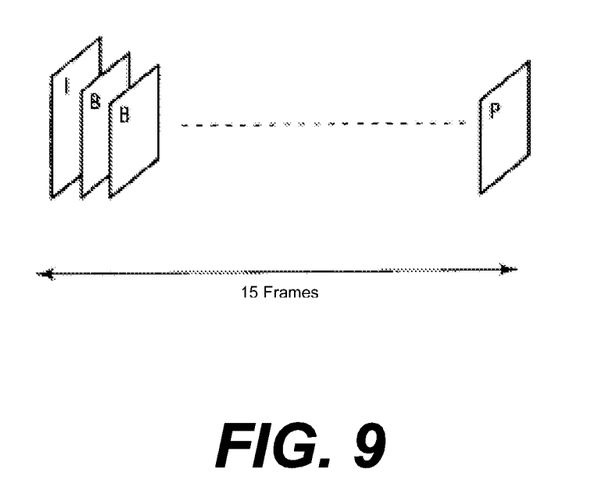
FIG. 9 is a figure showing the GOP structure which the video signal of the second embodiment has.

GOP structure is shown in FIG. 9. GOP includes the frame of three types below; I (Intra) frame by the encoding in a frame, P (Predictive) frame by forward direction prediction encoding between frames, B (Bidirectionally Predictive) frame by bidirectional prediction encoding. The frame of GOP is arranged with I B B P B B P - - - . The number of frames contained in one GOP is usually set as about 15 frames. If GOP structure is no longer a regular structure, a fault, like a noise is video or playback stops, will occur when the video is played back. For this reason, it is necessary to maintain the pattern of GOP structure in the case of a stream change.

The CPU 14 performs to manage a playback of video in a GOP unit. When it manages per GOP unit and the number of the frames which constitute GOP is odd, it becomes difficult to set up two screens simultaneously.

Figure 10:
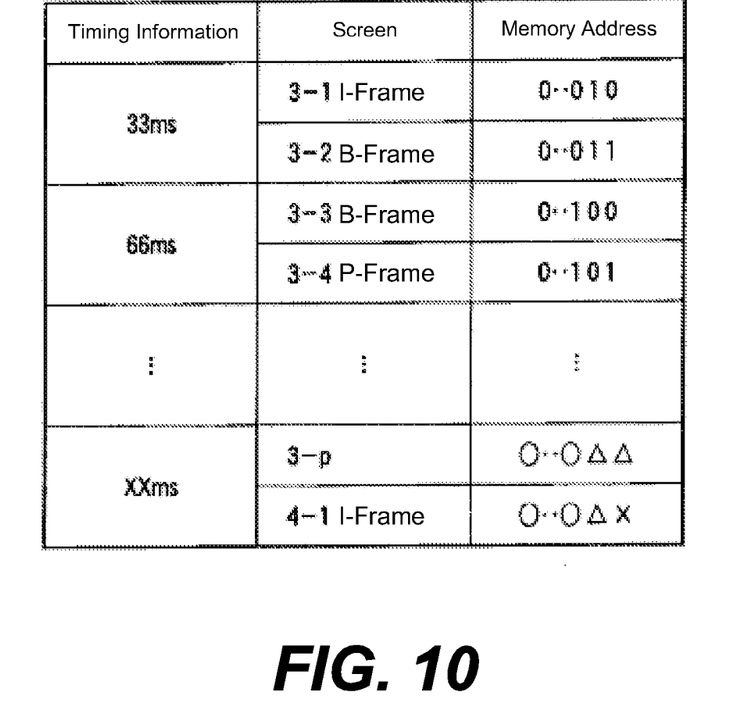
FIG. 10 is a figure showing an example of the memory content of the memory information table for the progressive video signals of GOP structure.

Then, when the contents of a notice from the decoder 12 are progressive video signal, as shown in FIG. 10, when CPU14 stores progressive video signal on the memory 13, the CPU 14 generates the memory information table 142 which contains the control cycle, two frames (among the I frame, the B frame, the P frame) of 33 ms, and a memory address, which are related each other. Moreover, in transition between GOP units, the CPU14 generates a memory information table 142 including the information which indicates the control cycle of 33 ms, the last frame of GOP (P frame), the next frame (I frame), and this frame (P frame and I frame), which are related each other.

And the CPU 14 monitors whether the playback command was received from the host system. When playback directions are received, the CPU 14 determines if the contents of the playback command are interlaced video signal.

When the contents of the playback command indicate progressive video signal, the CPU 14 outputs the flag for identifying progressive video signal to the playback device 15. The CPU 14 outputs the clock pulse of 33 ms cycle which indicates the storing place on the memory 13 to the playback device 15.

The playback device 15 monitors whether a flag is received from the CPU 14. The playback device 15 determines if the interlaced video signal is indicated from the contents of the flag, if a flag is received. When the received flag indicates an interlaced video signal, the playback device 15 reads and decodes the encoded video signal corresponding to every one screen from the addresses of the memory 13 in a cycle of 33 ms according to the screen information of one screen and a clock pulse, and outputs a video signal.

Figure 11:
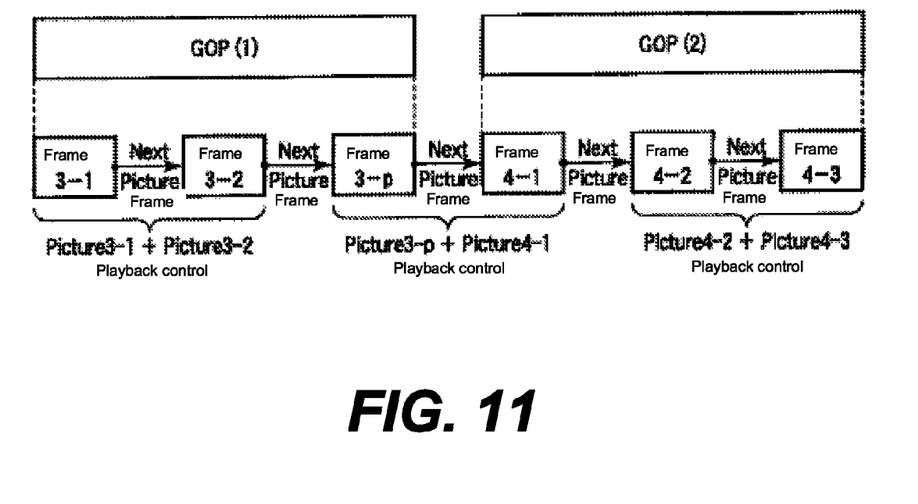
FIG. 11 is a figure showing the playback timing of the progressive video signal of GOP structure.

When the received flag indicates a progressive video signal, the playback device 15 monitors whether the leading edge of the clock pulse is detected, as shown in FIG. 11, When the leading edge of the clock pulse is detected, the screen (3-1) (I frame) of one screen is read from the memory 13, for example, the address at 0-010, and the trailing edge of a clock pulse is detected continuously.

If the trailing edge of a clock pulse is detected, the playback device 15 reads the screen (3-2) (B frame) of one screen for example, from address at 0 to address at 0101 of the memory 13.

And the playback device 15 monitors whether the leading edge of a clock pulse is also detected in a transition between GOP units. When the leading edge of a clock pulse is detected, the one screen of the last GOP (3-$p$) (P frame) is read from the addresses of the memory 13, and the trailing edge of a clock pulse is detected continuously.

If the trailing edge of a clock pulse is detected, the playback device 15 read the one screen of the following GOP structure (4-1) (I frame) from the addresses of the memory 13.

As mentioned above, according to the second embodiment, if it manages per GOP unit, the number of screens which constitutes GOP may turn into an odd number. In that case, the CPU 14 stores the screen information on the last which constitutes GOP related with the screen of the beginning of next GOP played back, on the memory information table, CPU14 performs playback control of the first screen and the second screen which is related with the first screen, when the CPU 14 performs playback control for two frames simultaneously. Thereby, a progressive video signal can play back without being influenced by a transition between GOP units.

[Third Embodiment]

In a 3rd embodiment, the video server is described below. An interlaced video signal and a progressive video signal are divided into a separate system, and the video server is configured that those video signals may be performed separately.

Figure 12:
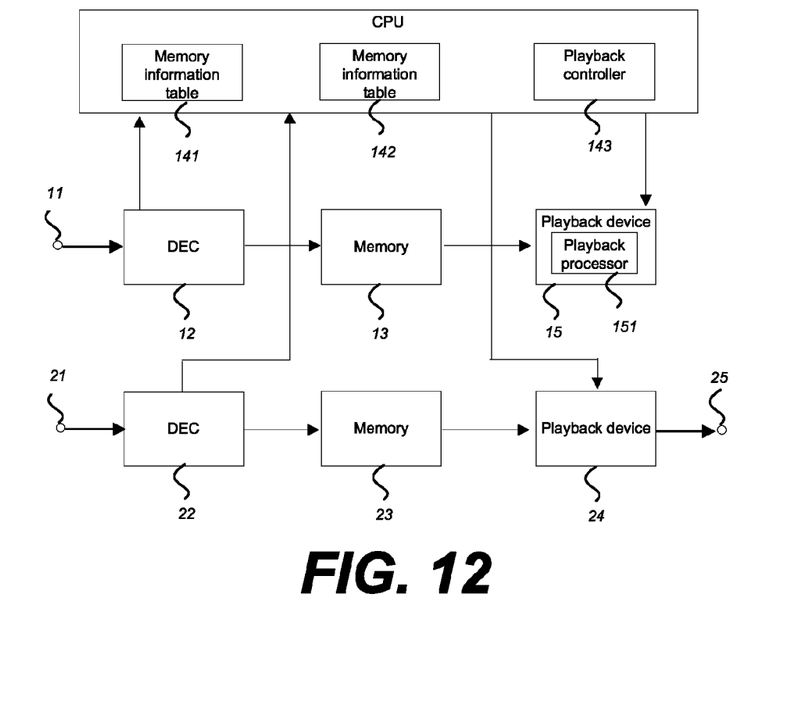
FIG. 12 is a block diagram showing the configuration of the video server according to the third embodiment.

FIG. 12 is a block diagram indicating the configuration of the video server according to the 3rd embodiment. In FIG. 12, the same mark is given to the same part as the FIG. 1, and detailed explanation is omitted. In FIG. 12, a encoding interlaced video signal is inputted into the input terminal 21, and a encoding progressive video signal is inputted into the input terminal 11.

In FIG. 12, the encoding interlaced signal inputted into the input terminal 21 is outputted to the decoder 22. The decoder 22 decodes a encoding interlaced signal to an interlaced video signal, transmits it to the suitable memory address of the memory 23, and notifies the memory address of the interlaced video signal stored on the memory 23 after the end of transmission to the CPU 14.

The CPU 14 generates the memory information table 141 based on the notice from the decoder 22. The memory information table 141 stores the data related with the timing information for reading an interlaced video signal from one screen, screen information for identification the screen, and memory address which indicates the storing place on the memory 13.

Moreover, the CPU 14 is configured to perform the playback controller according to the playback directions from a host system. The playback device 24 reads an interlaced video signal from the memory address to which the memory 23 corresponding the cycle of a clock pulse based on the control from the CPU 14, and outputs the interlaced video signal to the output terminal 25.

Next, the operation in the video server of the configuration is explained. First, the CPU 14 monitors whether received the notice from the decoder 12 or the decoder 22. When a notice is received, the CPUb14 analyzes the contents of the notice and determines if the notice indicates an interlaced video signal. If the notice indicates the interlaced video signal, when the CPU 14 stores the interlaced video signal in the memory 23, the CPU 14 generate the memory information table 141 including the control cycle of 33 ms, the one screen, and the memory address, which are related each other. If the notice indicates the progressive video signal, when CPU14 stores a progressive video signal in the memory 13, the CPU 14 generates the memory information table 142 including the control cycle of 33 ms and the two screens, and the memory address, which are related each other.

And the CPU 14 monitors whether playback directions were received from the host system. When playback directions are received, the CPU 14 determines if the contents of playback directions are interlaced video signals. When the contents of playback directions are interlaced video signals, the CPU 14 outputs the flag for identifying an interlaced video signal and the one screen information to the playback device 24, and the CPU 14 outputs the clock pulse of 33 ms indicating the storing place on the memory 23 to the playback device 24 continuously.

When the contents of playback directions are progressive video signals, the CPU 14 outputs the flag for identifying an progressive video signal and the two screen information to the playback device 15, and the CPU 14 outputs the clock pulse of 33 ms indicating the storing place on the memory 13 to the playback device 15 continuously.

The playback device 24 monitors whether the flag was received from the CPU 14. If a flag and the screen information of one screen are received, the playback device 24 begins to read one screen, and outputs the screen from the addresses of the memory 23 in a cycle of 33 ms according to a clock pulse.

When the contents of playback directions are progressive video signals, the playback device 15 monitors whether the leading edge of a clock pulse is detected. When the leading edge of a clock pulse is detected, the playback device 15 reads the screen (2-1) of one screen from the memory 13, for example, the address at 0-010, and the playback device 15 detects the trailing edge of a clock pulse continuously.

If the trailing edge of a clock pulse is detected, the playback device 15 reads the screen (2-2) of one screen for example, from address at 0 to address at 0101 of the memory 13.

Even if it is the third embodiment of the above as mentioned, the same function effect as the first embodiment is obtained. [0058]

[Other Embodiment]

Although the clock pulse explained the example supplied to a playback device from the CPU by each embodiment, a clock pulse may be supplied to a playback device from other apparatus, without restricting to this.

While certain embodiments have been described, these embodiments have been presented by way of example only, and are not intended to limit the scope of the inventions. Indeed, the novel embodiments described herein may be embodied in a variety of other forms; furthermore various omissions substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A video server, comprising:
a memory device configured to store a first video signal with a first predetermined time interval and a second video signal with a second predetermined time interval, the second predetermined time interval being an integer division of the first predetermined time interval;
a playback device configured to play back alternatively the first type of video signal and the second type of video signal from the memory device; and
a main controller configured to control processing of the memory device and the playback device,
wherein the main controller comprises:
a first table configured to store the first timing information, a screen of playback of the first type of video signal, and a memory address of the screen of playback of the first type of video signal,
a second table configured to store the first timing information, screen information identifying a integer multiple of screens of playback for the second type of video signal, and a memory address of the integer multiple of screens of playback for the second type of video signal; and
a playback controller configured to output screen information of one screen with reference to the first table if a playback direction for the first type of video signal is received, and output screen information of integer multiple screens with reference to the second table if a playback direction for the second type of video signal is received.

2. The video server of claim 1 further comprising:
the playback device comprising a playback processor configured to
read from the memory device the screen of playback of the first type of video signal using the memory address of the screen of playback of the first type based on a clock pulse if the playback device receives a first information from the playback controller; and
read from the memory device the screen of playback of the second type of video signal for integral multiple screens using the memory address of the screen of playback of the second type based on a changing point of the clock pulse level if the playback device receives a second information from the playback controller.

3. The video server of claim 1, wherein,
the first type of video signal is an interlaced video signal that changes the screen displayed with 33 ms cycle, and the second type of video signal is a progressive video signal that changes the screen displayed with 16.5 ms cycle.

4. The video server of claim 1, wherein,
if the second type of video signal has GOP (Group Of Pictures) structure including a I-frame encoded video signal in frame, a plurality of P-frames by forward direction prediction encoding between frames, and a plurality of B-frames by bidirectional prediction encoding, the second table is configured to store the first timing information, a first screen information identifying a last screen in the GOP, and a second screen information identifying a head of screen in the next GOP if the second type of video signal is played back in transition between GOP units.

5. A video server, comprising,
a first memory device configured to store a first type of video signal having a first predetermined time interval;
a second memory device configured to store a second type of video signal having a second predetermined time interval, the second predetermined time interval an integer division of the first predetermined time interval;
a first playback device configured to play back the first type of video signal stored in the first memory device;
a second playback device configured to play back the second type of video signal stored in the memory device; and
a main controller configured to control processing of the first memory device, the second memory device, the first playback device, and the second playback device,
wherein the main controller comprises:
a first table configured to store the first timing information, a screen of playback of the first type of video signal, and a memory address of the screen of playback of the first type of video signal,
a second table configured to store the first timing information, screen information identifying a integer multiple of screens of playback for the second type of video signal, and a memory address of the integer multiple of screens of playback for the second type of video signal; and
a playback controller configured to output screen information of one screen with reference to the first table if a playback direction for the first type of video signal is received, and output screen information of integer multiple screens with reference to the second table if a playback direction for the second type of video signal is received.

6. The video server of claim 5 wherein the second playback device includes a playback processor configured to read the first type of video signal for one screen from the memory address based on a clock pulse if the playback device receives a first information from the playback controller with the first predetermined time interval and receives the clock pulse; and read the second type of video signal for integral multiple screens from the playback controller with a changing point of the clock pulse level if the playback device receives a second information from the playback controller with the first predetermined time interval and receives the clock pulse.

7. The video sever of claim 5, wherein,
the first type of video signal is an interlaced video signal that changes the screen displayed with 33 ms cycle, and the second type of video signal is a progressive video signal that changes the screen displayed with 16.5 ms cycle.

8. The video sever of claim 5, wherein,
if the second type of video signal has GOP (Group Of Pictures) structure including a I-frame encoded video signal in frame, a plurality of P-frames by forward direction prediction encoding between frames, and a plurality of B-frames by bidirectional prediction encoding, the second table stores the first timing information, a first screen information identifying last of screen in the GOP, and a second screen information identifying a head of screen in the next GOP if the second type of video signal is played back in transition between GOP units.

9. A method for controlling a video server comprising:
storing a first video signal with a first predetermined time interval and a second video signal with a second predetermined time interval, the second predetermined time interval being an integer division of the first predetermined time interval;
playing back, through a playback device, the first type of video signal and the second type of video signal;
storing the first timing interval with screen information identifying a screen of playback of the first type of video signal and a memory address of the screen of playback of the first type of video signal in a first table;
storing the first timing interval with screen information identifying an integer multiple of screens of playback of the second type of video signal and a memory address of the screens of playback of the second type of video signal in a second table; and
outputting screen information of one screen from the memory device with reference to the first table if a playback direction for the first type of video signal is received, and outputting screen information of integer multiple screens from the memory device with reference to the second table if a playback direction for the second type of video signal is received;
reading the screen of playback of the first type of video signal using the memory address of the screen of playback of the first type based on a clock pulse if the playback device receives a first playback signal; and
reading the screen of playback of the second type of video signal for integral multiple screens using the memory address of the screen of playback of the second type based on a changing point of the clock pulse level if the playback device receives a second playback signal.

10. The method of claim 9, wherein the first type of video signal is an interlaced video signal that changes the screen displayed with 33 ms cycle, and the second type of video signal is a progressive video signal that changes the screen displayed with 16.5 ms cycle.

11. The method of claim 9 wherein if the second type of video signal has GOP (Group Of Pictures) structure including a I-frame encoded video signal in frame, a plurality of P-frames by forward direction prediction encoding between frames, and a plurality of B-frames by bidirectional prediction encoding, the second table is configured to store the first timing information, a first screen information identifying a last screen in the GOP, and a second screen information identifying a head of screen in the next GOP if the second type of video signal is played back in transition between GOP units.

* * * * *